United States Patent Office 2,999,757
Patented Sept. 12, 1961

2,999,757
METHOD FOR PRODUCING CELLULOSIC SAUSAGE CASINGS AND PRODUCT
Edward A. Shiner, Chicago, and Cyril J. Brounstein, Park Forest, Ill., assignors to Union Carbide Corporation, a corporation of New York
No Drawing. Filed Oct. 30, 1959, Ser. No. 849,742
5 Claims. (Cl. 99—176)

This invention relates to improved cellulosic sausage casings. More particularly, the invention relates to improved shirred casings for the processing of weiners or frankfurters, characterized by being more rapidly stuffed with sausage emulsion and having higher burst pressures and smaller changes in diameter during stuffing than cellulosic casings heretofore produced.

Conventionally seamless cellulosic casings for the processing of wieners or frankfurters are manufactured by annularly extruding viscose into a coagulating and regenerating bath to form tubing which is thereafter washed and then plasticized with an aqueous solution of glycerol or glycol. The resultant tubing at this stage is known in the art as "gel cellulosic tubing" in that up to this point it has never been dried. The gel cellulosic tubing is thereafter dried while inflated, the inflation causing the casing to stretch a small amount. The dried casing is then shirred and compressed to a relatively rigid hollow stick structure, for example, a fifty foot length of casing is shirred and compressed to yield a stick between about 10 to 15 inches in length. Such a stick can be conveniently and rapidly sheathed over the tubular stuffing horn of the usual sausage stuffer, the horn having a diameter equal to or slightly smaller than the diameter of the stick's bore.

In the processing of wieners or frankfurters, the shirred stick of cellulosic casing is placed on a stuffing horn attached to a stuffer containing the sausage or meat emulsion. A tab of the casing is unshirred and pulled beyond the tip of the stuffing horn to form a constriction. The valve connecting the stuffing horn to the stuffer is opened and the sausage emulsion under pressure of the order of 75 to 125 pounds per square inch gauge in the stuffer is forced through the stuffing horn and into the casing, forcing the casing to unshirr and fill. The stuffing machine operator generally holds back the casing to allow the internal pressure exerted by the emulsion to slightly distend the casing to the desired size. It is to be understood that even though the emulsion is stuffed into dry casing, the moisture of the emulsion will tend to wet the casing while it is still under pressure exerted by the emulsion. This causes the casing to distend an amount which is dependent upon the internal pressure exerted by the meat emulsion, the extent to which the casing is wetted, and the time during which the wetted casing is under pressure.

At high stuffing rates the wetting time and the time during which the wetted casing is subjected to the stuffing pressures are relatively short, while at slower stuffing rates the pressure-wetting time factor is greater, causing the casing to be distended to a larger extent with the same holdback. This larger distention at slower stuffing rates makes size control difficult and tends to result in a somewhat non-uniform product.

After stuffing, the casings are usually sprayed with water and then linked to desired length units. The linking operation subjects the filled casing to additional pressure, causing further expansion of the casing, the expansion being on the order of 0.03 to 0.06 inch increase in diameter for a stuffed casing having a nominal diameter of 0.76 inch.

Cellulosic sausage casings heretofore available imposed several limitations on the overall stuffing process including lower stuffing speeds than desired and non-uniform expansions during stuffing and linking.

The stuffing speed at any given stuffing pressure is dependent upon the bore diameter and bore length of the stuffing horn, and hence stuffing speed increases the larger the bore diameter and the shorter the bore length. However, these dimensions of the stuffing horn are necessarily dependent on the bore and length dimensions of the shirred and compressed stick of cellulosic casing.

The hole diameter of the shirred casing stick is a factor limiting the maximum diameter of the orifice of the stuffing horn over which the shirred cellulosic casing stick can be placed. The length of the shirred cellulosic casing stick is the limiting factor of the minimum length of the stuffing horn over which the shirred cellulosic casing stick is placed.

While it would appear the hole diameter of conventional shirred casing could be increased by shirring conventional casing of larger dry diameter and thereby permitting the use of stuffing horns of larger orifice diameters for faster stuffing operations, such expedient is inoperable because upon stuffing the casing it would distend to a larger stuffed diameter than is desired in the final stuffed product.

Furthermore, the stuffing operator in using conventional cellulosic casings has great difficulty in producing consistently a stuffed product of uniform size. Again this is due to the fact that the conventional casings when wetted expanded greatly with slight changes in stuffing pressures. A uniform size stuffed product is essential for automatic packaging of the stuffed product, particularly where it is desired to package to a constant weight the same number of unit items.

Another deficiency of conventional casings is their relatively low burst pressure.

Accordingly, it is an object of this invention to provide cellulose sausage casings which can be filled with sausage emulsion to a desired stuffed diameter more rapidly than heretofore possible.

Another object is to provide shirred cellulosic sausage casing of larger shirred hole diameter than shirred casings heretofore made but yielding upon stuffing the same final stuffed diameter as the conventional casing.

Another object is to provide cellulosic casings having a lower degree of distention upon being subjected to stuffing pressure and a higher burst pressure than heretofore available.

An additional object of this invention is to provide cellulosic casings which when stuffed with sausage emulsion such as is employed in the production of weiners or frankfurters yields a substantially more uniform and cylindrical product than heretofore produced.

Other objects will become apparent as the description of the invention proceeds.

According to the present invention, cellulosic casings having improved stuffing behavior are obtained by subjecting a wet gel regenerated cellulose casing (never dried) after being washed and suitably plasticized as for example with glycerol to a drying operation wherein concurrently during the drying step the casing is transversely stretched to a final diameter at least 35% greater and preferably not over 55% greater than the diameter of casing as it existed in the gel state, and longitudinally stretched between about 2% and 8% over its length in the gel state. The resultant dried casing is thereafter shirred and compressed to produce a shirred stick of casing by methods and apparatus well known to the art.

In one embodiment of this invention, the cellulosic casings are prepared by regeneration of viscose. The casings are formed by continuously extruding viscose upwardly through an annular orifice into an aqueous coagulating and regenerating bath containing sodium sulfate and sulfuric acid. The seamless cellulosic tubings thus formed are then successively passed through a series of tubs containing suitable aqueous acid solutions, and thereafter washed with water to remove the acid and salts. The washed tubings are then plasticized by passing the regenerated cellulosic tubing through a water solution containing a water-soluble hydroscopic plasticizer such as glycerine or a glycol. The regenerated cellulosic tubing which has been washed and plasticized will hereinafter be referred to as "gel cellulosic tubing" (never dried).

In the embodiment wherein the viscose process is used, it is preferred that the viscose composition be comprised of from 6% to 8% by weight of cellulose, 5% to 7% by weight of sodium hydroxide, have a Gamma number of from between 34 to 50 at the time of extrusion, and preferably the cupriethylene-diamine viscosity of the cellulose in the resultant casing be maintained at least 4.4 centipoises. Strength and durability of the casings is related to its cupriethylene-diamine solution viscosity. Thus, casings having a solution viscosity less than 4.4 centipoises tend to be weak and rupture more frequently than casings of higher solution viscosities.

The Gamma number is the number of the xanthate sulphur groups per 100 anhydro glycose units and is obtained by the method described in "Industrial and Engineering Chemistry," vol. 17, page 624 (1945).

The cupriethylene-diamine viscosity is determined on a solution containing 0.5% by weight of cellulose dissolved in a cupriethylene-diamine solution, 0.5 molar in copper as described in TAPPI test method T 230–sm–50.

Preferably, the casing is plasticized with glycerine. A percentage of glycerine ranging from 15% to 25% glycerine based on the total weight of glycerine and cellulose in the casing has proven satisfactory.

The desired longitudinal and transverse stretching of the gel cellulosic tubings during drying is readily obtained as for example by inflating the tubing with air under sufficient pressure, usually about 4 to 8 pounds pressure per square inch gauge.

Illustrative of apparatus suitable for transversely and longitudinally stretching the gel casing during drying is that shown in U.S. Patent 1,967,773 to A. G. Hewitt. Such apparatus comprises a housing in which heated air is circulated and through which the gel casing is advanced continuously by means of paired rotating rolls positioned posterior and anterior of the housing. An inflating quantity of air is confined within that part of the casing extending between the anterior rolls and the posterior rolls.

The relative speed of the anterior rolls to the posterior rolls determines the longitudinal stretch imparted to the casing, while the internal air pressure maintained in the casing determines the transverse stretch imparted to the tubing. The casing which has been dried will hereinafter be referred to as "cellulosic casing."

After drying, the cellulosic casing is flattened in its passage through the posterior rolls of the dryer and wound on reels.

The dried flattened casings are then shirred. In shirring, an appropriate length of the cellulosic casing is shirred and compressed into a shirred stick by methods known in the art including those disclosed in Dietrich, U.S. Patent 2,010,626.

Preferably, the gel tubing is dried to a moisture content of 7% to 15% by weight and is transversely stretched 35% to 55% and optimumly 40% to 50%, based on the diameter of the gel cellulosic tubing, to produce the casing of this invention. The longitudinal stretch imparted is preferably between 2% and 8% and optimumly 3% to 5%, based on the gel tubing length. Below 2% longitudinal dryer stretch, there is a tendency for slack to build up during the stretching and drying, while above 8% longitudinal dryer stretch the longitudinal stretch of the rewet casing is decreased and breakage during processing of the meat emulsion contained therein may become excessive.

Less than about 35% transverse stretch during drying does not appreciably improve the casing characteristics from that heretofore produced. When cellulose casing is stretched transversely more than about 55%, many operating problems are encountered. It is extremely difficult to simultaneously dry and transversely stretch beyond about 55%. Also, the relative thickness of the tubing in the gel state being quite large and the internal diameter relatively small, there are also difficulties encountered in regeneration of the cellulose tubing, such as excessive gassing and watering. Simultaneously drying and transversely stretching over about 55% results in a casing which has little or no residual stretch upon rewetting and such casing will tend to break excessively during stuffing and processing of the frankfurters. Furthermore, since the casing will be filled to capacity without the necessity of any holdback, size control is difficult.

Preferably the simultaneous drying and stretching to which the casings are subjected are such to obtain the described stretch characteristics and a birefringence value not more than $20 \times 10^{-4}$ and optimumly from $-20 \times 10^{-4}$ to $+20 \times 10^{-4}$.

The birefringence values are dimensionless units and are obtained as follows:

(1) A single thickness casing is placed on the stage of a polarizing microscope with the machine direction of the casing parallel to the 0–180° base.

(2) The stage is rotated clockwise 90°.

(3) The quartz wedge is inserted and the dark line is centered over the cross hairs.

(4) The reading obtained on the scale is recorded. Note: This is the retardation in dimensional units of millimicrons.

(5) The thickness of the film is measured in mils.

(6) The retardation value is divided by the thickness of the film to obtain the birefringence. Birefringence is dimensionless and the resulting units are $\times 10^{-4}$.

The principles and nature of the invention are further illustrated in the subsequent examples, the scope of the invention being not limited thereto except as set forth in the appended claims.

For comparative purposes in the following examples all the casings of the invention and the casings representative of the prior art were prepared by extrusion of viscose compositions containing 7% by weight of cellulose and 6% by weight of sodium hydroxide, and having a gamma number of about 35 at the time of extrusion, said viscose composition after regeneration yielding a regenerated cellulose which when solubilized in a cupriethylene-diamine solution, 0.5 molar in copper according to TAPPI test method T 230–sm–50 has a viscosity of at least 4.4 centipoises. In each instance, the viscose was extruded through an annular orifice into a coagulating bath containing sodium sulfate and sulphuric acid and thereafter regenerated, washed, and plasticized with glycerine by procedures well known to those in the art. The gel tubing containing about 20% glycerine based on the total weight of glycerine and cellulose was passed into a hot-air dryer of the type disclosed by A. G. Hewitt in U.S. Patent 1,967,773, which is comprised of a heating tunnel having an entrance and an exit set of squeeze rollers on the dryer. A bubble of air was maintained within the tubing between the two sets of squeeze rollers to distend and stretch the tubing transversely. The exit squeeze rollers were driven at a greater peripheral speed than the inlet squeeze rollers to pick up the slack formation and to impart about a 4% longitudinal stretch. All the casings were dried to a moisture content between 7% and 15% by weight.

EXAMPLE 1

A viscose composition as described supra was annularly extruded to form tubular casings having, after regeneration, washing, and plasticizing, a diameter (as gel tubing) of 0.51 inch. The gel tubing was concurrently stretched and dried while inflated with air to produce dry casing having a diameter of 0.75 inch and a moisture content of 9% by weight. A 55 foot length of the dried casing was shirred to a compressed length of about 13 inches by subjecting the casing in an inflated state and sheathed over a mandrel to the shirring action of a plurality of cog surfaced rolls arranged and positioned about the inflated casing in a manner forming a gyrating passage for the casing, whereby the casing is shirred in a pattern of helically arranged pleats. The mandrel on which the casing was shirred had a diameter of 0.555 inch in the shirring zone. The shirred stick of casing was then conditioned to a moisture content of 12% to 18% by weight before being stuffed with sausage emulsion. The conditioned shirred stick had a bore large enough to be readily sheathed over a stuffing horn having an outside diameter of 0.463 inch. The shirred casing was filled with sausage emulsion and after linking, the diameter of the linked sausages was a nominal 0.728 inch and they were uniformly cylindrical.

By way of comparison in order to make from the same viscose as in Example 1 conventional casing having the same diameter after stuffing and linking as in Example 1, it was necessary to extrude the viscose to a larger gel tubing diameter (0.567 inch); such gel tubing was inflated and dried under the prior art conditions of stretching the casing a small amount, namely to a dry casing diameter of 0.707 inch. Due to its smaller dried diameter, it was impossible to satisfactorily shirr this conventional casing using the 0.555 inch diameter mandrel described in Example 1, and instead, a smaller mandrel having a diameter of about 0.51 inch in the shirring zone was found to be the largest size practical to be used with this casing. The resultant shirred casing after being conditioned to a moisture content of 12% to 18% by weight could be sheathed satisfactorily on stuffing horns having a maximum outside diameter not exceeding 0.437 inch. Consequently, the conventional casing did not stuff as rapidly as the casing of Example 1. Moreover, the stuffed casing was less uniform in diameter than the stuffed casing of Example 1.

The dimensional data of the casings made according to Example 1 and the corresponding conventional casings are set forth in the subsequent table.

*Table I*

| | Example 1 | Conventional Casing |
|---|---|---|
| Gel Tubing Diameter in inches | 0.51 | 0.567 |
| Dry Casing Diameter in inches | 0.75 | 0.707 |
| Percent Transverse Stretch Imparted During Drying of Gel Tubing | 47.1 | 24.7 |
| Wall Thickness of Dried Casing in mils | 0.94 | 1.0 |
| Bone-Dry Gauge (Grams per 100 foot length of dried casing) | 45.0 | 45.9 |

Bone-dry gauge of the casing is readily ascertained by cutting a unit length of casing, washing out the plasticizer and any other additive therefrom, and thereafter drying the cellulose at elevated temperatures to insure an anhydrous weight. The casing bone-dry gauge is maintained to produce a dry casing wall thickness of about between 0.0005 inch and 0.0015 inch, preferably about 0.001 inch.

Too great a thickness or bone-dry gauge results in a casing which has too little change in diameter when subjected to internal pressures of 150 millimeters of mercury to 300 millimeters of mercury. Too small a thickness or bone-dry gauge results in reduced pressures at which the casing will burst.

Preferably the casings of this invention should have the bone-dry gauge fall within the formula:

$$\text{Bone-dry gauge} = (62.7D - 10.3) \text{ to } (93.9D - 15.5)$$
$$(\text{grams}/100 \text{ feet})$$

wherein D is the diameter of the casings in inches attained after being wetted and subjected to an internal air pressure of 200 millimeters of mercury.

Optimumly, the casings of this invention have the bone-dry gauge fall within the formula:

$$\text{Bone-dry gauge} = (70.5D - 11.6) \text{ to } (86.1D - 14.2)$$
$$(\text{grams}/100 \text{ feet})$$

wherein D is the diameter of the rewet casings attained at an internal air pressure of 200 millimeters of mercury.

EXAMPLE 2

A viscose composition according to Example 1 was extruded and regenerated to form gel tubing having a diameter of 0.575 inch. It was concurrently dried and transversely stretched in the manner hereinbefore described to a dry casing diameter of 0.865 inch, this being a 50.5% increase in the transverse diameter. Longitudinal stretch imparted in drying was 4%. The resultant dried casing was shirred and after stuffing with sausage emulsion and linking, a uniform linked sausage having a nominal stuffed diameter of 0.85 inch was obtained.

For purposes of comparison in order to prepare a conventional casing which, after stuffing and linking, had substantially the same nominal stuffed diameter, it was necessary to form from the same viscose composition a gel tubing of larger diameter, e.g., 0.655 inch, which after drying and stretching the limited amount hitherto employed by the art, had a dry casing diameter of 0.827 inch corresponding to 26.3% increase in diameter over the gel tubing diameter.

Previously it has been pointed out that the conventional dried cellulosic casings hitherto available upon being wetted and subjected to stuffing pressures expanded more than was desired and thus the stuffing operator had difficulty in obtaining consistently uniform stuffed diameters in the final product. In subsequent Table II, data are presented demonstrating that casings of the present invention exhibit considerably less expansion on being inflated in the wetted state by air at various pressures than do the conventional casings. The data in Table II further show that the casings of the present invention can be stuffed without bursting at considerably higher pressures than the conventional casings.

*Table II*

| | Example 2 | Conventional Casing |
|---|---|---|
| Gel Tubing Diameter in inches | 0.575 | 0.655 |
| Dry Casing Diameter in inches | .865 | .827 |
| Percent Transverse Stretch | 50.5 | 26.3 |
| Diameter at Internal Air Pressure in millimeters (mm.) Hg.: | | |
| Rewet Casing: | | |
| 100 mm | .795 | .790 |
| 150 | .76 | .76 |
| 200 | .81 | .81 |
| 250 | .85 | .86 |
| 300 | .90 | .94 |
| At Burst Diameter | .97 | 1.11 |
| Burst Pressure | 1.21 | 1.32 |
| | 387 | 319 |
| Change in diameter in inches from 150–300 mm. Hg | .16 | .30 |
| Ratio: Change in Diameter from 150–300 mm. Hg / Diameter at 200 mm. Hg. | .188 | .349 |
| Birefringence (in terms of $10^{-4}$) | (−15) to (+15) | 35 to 45 |
| Bone-Dry Gauge | 54 | 54 |
| Wall thickness of dried casing in mils | 1.0 | 1.0 |

In connection with the casing of the present invention, it is preferred to maintain the change in diameter of the rewet casing with change in internal pressures from 150 millimeters of mercury to 300 millimeters of mercury to certain definite limits. Too great a change in diameter with change in internal pressure results in erratic size control during stuffing operations. Too little change in diameter with change in internal pressure does not allow for relief of excessive internal pressures that may occur during the stuffing operation and processing of the meat emulsion with the result that the breakage may be increased.

The ratio of the change in diameter of the rewet casing when subjected to internal pressures of from 150 to 300 millimeters of mercury to the diameter of the rewet casing at an internal pressure of 200 millimeters of mercury is preferably maintained not greater than 0.20, and optimumly from 0.10 to 0.20.

Since the casings are used at the diameters corresponding approximately to those attained at internal air pressures of about 200 millimeters of mercury, it can be readily seen that the dimensions in the range of this pressure are critical.

The regenerated cellulosic casings of this invention are preferably produced by the viscose process. It is to be understood, however, that the principles of this invention can be applied to cellulosic casings wherein the regenerated cellulose is produced by other known processes, as for example by the denitration of nitrocellulose, or by deacetylation of cellulose acetate, or by regeneration of cuprammonium cellulose. Solutions of such cellulose derivative can be extruded to form tubular casing, and after regeneration the resultant casing, being in a wet-gel, can be dried while concurrently stretched as hereinbefore described.

This application is a continuation-in-part of our copending application Serial No. 821,706 filed June 22, 1959.

What is claimed is:

1. In the method for producing cellulosic casing by the annular extrusion of a solution of a regeneratable cellulose derivative to form after regeneration, washing, and plasticizing, a gel cellulosic tubing, the steps which comprise concurrently drying and stretching said gel cellulosic tubing from 35% to 55% in the transverse direction and from 2% to 8% in the longitudinal direction, the wall thicknesses of the gel cellulosic tubing being such that after said drying and stretching, the bone-dry gauge of the dried casing is from $62.7D-10.3$ to $93.9D-15.5$ grams cellulose per 100 foot length of dried casing, D being the attained diameter of the casing in inches upon being wetted and inflated by an internal air pressure of 200 millimeters of mercury.

2. Process according to claim 1 wherein the regeneratable cellulose derivative is a viscose having a gamma number between 34 and 50, the gel tubing is stretched from 40 percent to 50 percent in the transverse direction and from 3 percent to 5 percent in the longitudinal direction, and the bone dry gauge of the casing is from $70.5D-11.6$ to $86.1D-14.2$ grams per 100 foot length of casing.

3. In the method for producing cellulosic sausage casing by the annular extrusion of a solution of a regeneratable cellulose derivative to form after regeneration, washing, and plasticizing, a gel cellulosic tubing, the steps which comprise concurrently drying and stretching said gel cellulosic tubing from 35% to 55% in the transverse direction and from 2% to 8% in the longitudinal direction and the bone dry gauge of the dried casing is from $70.5D-11.6$ to $86.1D-14.2$ grams of cellulose per 100 foot length of dried casing, D being the attained diameter of the casing in inches upon being wetted and inflated by an internal air pressure of 200 millimeters of mercury, and then shirring and compressing the dried casing to form a compressed shirred stick of casing.

4. A regenerated cellulose sausage casing of extended length adapted to be stuffed to produce a length of sausage, which casing is adapted to be linked at intervals along the length thereof after stuffing, to produce a length of linked sausages, said linking reducing the internal volume of said casing thereby taking up any slack therein to produce a relatively taut, wrinkle-free sausage casing, said sausage casing having been continuously extruded from a solution of a regeneratable cellulose derivative, and then regenerated, washed and plasticized to form gel cellulosic casing; said gel casing having been stretched during drying thereof 35% to 55% in the transverse direction and 2% to 8% in the longitudinal direction to form a dry casing having: a bone dry gauge of $67.7D-10.3$ to $93.9D-15.5$ grams of cellulose per 100 foot length of dried casing, D being the attained diameter of the casing in inches upon being wetted and inflated by an internal air pressure of 200 millimeters of mercury; a viscosity of at least 4.4 centipoises when dissolved in cupriethylenediamine solution 0.5 molar in copper, according to TAPPI test method T–230–sm–50; and a ratio of change in diameter of said wetted casing at inflation pressures from 150 to 300 millimeters of mercury to the diameter of the wetted casing at an inflation pressure of 200 millimeters of mercury from 0.1 to 0.2.

5. A regenerated cellulose sausage casing as described in claim 4, wherein said regeneratable cellulose derivative is viscose having a gamma number of at least 34.

References Cited in the file of this patent

UNITED STATES PATENTS

| 1,612,509 | Henderson et al. | Dec. 28, 1926 |
| 1,959,978 | Freund | May 22, 1934 |
| 1,967,773 | Hewitt | July 24, 1934 |
| 2,043,172 | Hewitt | June 2, 1936 |
| 2,271,932 | Atkinson | Feb. 3, 1942 |
| 2,401,773 | Reichel et al. | June 11, 1946 |
| 2,401,798 | Reichel | June 11, 1946 |

FOREIGN PATENTS

| 319,771 | Great Britain | Aug. 21, 1930 |

UNITED STATES PATENT OFFICE
CERTIFICATE OF CORRECTION

Patent No. 2,999,757                        September 12, 1961

Edward A. Shiner et al.

It is hereby certified that error appears in the above numbered patent requiring correction and that the said Letters Patent should read as corrected below.

Column 8, line 29, for "67.7D" read -- 62.7D --.

Signed and sealed this 15th day of January 1963.

(SEAL)
Attest:

ERNEST W. SWIDER
Attesting Officer

DAVID L. LADD
Commissioner of Patents